United States Patent
Turner et al.

(10) Patent No.: US 10,201,830 B2
(45) Date of Patent: Feb. 12, 2019

(54) DISPENSING DEVICE

(71) Applicant: Sulzer Mixpac AG, Haag (CH)

(72) Inventors: Hayden Turner, Ayer, NH (US); Victor Clemens, Buchs (CH); Jes Hickman, Vanloese (DK); Robert Lindsey, Pelham, NH (US)

(73) Assignee: SULZER MIXPAC AG, Haag (CH)

( * ) Notice: Subject to any disclaimer, the term of this patent is extended or adjusted under 35 U.S.C. 154(b) by 0 days.

(21) Appl. No.: 15/825,574

(22) Filed: Nov. 29, 2017

(65) Prior Publication Data

US 2018/0078967 A1    Mar. 22, 2018

Related U.S. Application Data

(62) Division of application No. 14/985,980, filed on Dec. 31, 2015, now Pat. No. 9,862,001.

(51) Int. Cl.
*B05C 17/005* (2006.01)
*B05C 17/01* (2006.01)
*H02P 7/285* (2016.01)

(52) U.S. Cl.
CPC ...... *B05C 17/012* (2013.01); *B05C 17/00553* (2013.01); *B05C 17/00559* (2013.01); *B05C 17/0103* (2013.01); *H02P 7/285* (2013.01)

(58) Field of Classification Search
CPC ............ B05C 17/012; B05C 17/00559; B05C 17/00553; B05C 17/0103; H02P 7/285
See application file for complete search history.

(56) References Cited

U.S. PATENT DOCUMENTS

| | | | |
|---|---|---|---|
| 5,556,009 A | 9/1996 | Motzko | |
| 5,775,539 A * | 7/1998 | Bates | B05C 17/0103 222/1 |
| 8,020,727 B2 | 9/2011 | Herman et al. | |
| 8,292,128 B2 | 10/2012 | Hagleitner | |
| 8,346,507 B2 | 1/2013 | Shahi et al. | |
| 8,387,825 B2 * | 3/2013 | Herman | B05C 17/0103 222/1 |
| 8,528,785 B2 * | 9/2013 | Naughton | B05C 17/00553 222/137 |
| 8,573,450 B2 * | 11/2013 | Hsu | B05C 17/0103 222/333 |
| 8,684,229 B2 | 4/2014 | Harre et al. | |
| 8,919,456 B2 | 12/2014 | Ng et al. | |
| 8,957,608 B2 | 1/2015 | Hsu et al. | |

(Continued)

FOREIGN PATENT DOCUMENTS

EP    1570805 A1    9/2005

OTHER PUBLICATIONS

International Search Report and Written Opinion dated Feb. 17, 2017 in International Application No. PCT/EP2016/081488, filed Dec. 16, 2016.

*Primary Examiner* — Donnell A Long
(74) *Attorney, Agent, or Firm* — Global IP Counselors, LLP

(57) ABSTRACT

A dispensing device includes a drive unit, a detector and a controller. The drive unit is configured to operate a material dispenser. The detector is configured to detect a velocity of the material sensor. The controller is programmed to maintain the material dispenser at a constant velocity based on the velocity detected by the detector.

8 Claims, 5 Drawing Sheets

(56) References Cited

U.S. PATENT DOCUMENTS

| | | | |
|---|---|---|---|
| 9,039,557 B2* | 5/2015 | Naughton | B05C 17/0103 |
| | | | 221/229 |
| 9,358,572 B2* | 6/2016 | Grontved | B05C 17/012 |
| 9,359,122 B2* | 6/2016 | Schmid | B05C 17/0103 |
| 9,511,923 B2* | 12/2016 | Naughton | G01F 11/00 |
| 9,656,286 B2* | 5/2017 | Aigner | B05C 17/00553 |
| 2004/0045982 A1 | 3/2004 | Herman et al. | |
| 2008/0047974 A1 | 2/2008 | Glasgow | |
| 2010/0001017 A1 | 1/2010 | Herman et al. | |
| 2012/0055951 A1 | 3/2012 | Herman et al. | |
| 2015/0014351 A1 | 1/2015 | Grontved et al. | |
| 2015/0034675 A1 | 2/2015 | Grontved et al. | |
| 2015/0266050 A1 | 9/2015 | Beckett et al. | |

* cited by examiner

DISPENSING DEVICE

CROSS-REFERENCE TO RELATED APPLICATION

This application is a divisional application of U.S. patent application Ser. No. 14/985,980, filed Dec. 31, 2015, the contents of which are hereby incorporated herein by reference.

BACKGROUND

Field of the Invention

The present invention relates to a dispensing device. In particular, the present invention relates to a dispensing device including a drive unit, a detector, and a controller for dispensing a material.

Background Information

Conventional dispensers are known to dispense materials. In conventional dispensers a target speed is derived from the input of two potentiometers (e.g., a speed dial and a trigger) and the corresponding effective voltage for that target speed is determined. This effective voltage is converted to a pulse length by using the nominal voltage and this signal is delivered to the motor. For safety reasons, the current through the motor can be measured and if the current is above a critical threshold, dispensing is aborted. Upon termination of the dispensing, the plungers can be moved backwards (i.e., an anti-drip mode).

SUMMARY

It has been discovered that continuous monitoring of the speed of a dispensing device and the current supplied to the motor, and modification of these parameters would be advantageous.

In view of the state of the known technology, one aspect of the present disclosure is to provide a dispensing device comprising a motor, a detector and a controller. The motor is configured to operate a material dispenser. The detector is configured to detect a velocity of the material sensor. The controller is programmed to maintain the material dispenser at a constant velocity based on the velocity detected by the detector.

Another aspect of the present disclosure in to provide a dispensing device comprising a motor, a detector and a controller. The motor is configured to operate a material dispenser. The power supply is configured to provide a voltage to the motor to operate the material dispenser. The controller is programmed to monitor a current provided to the motor based on the voltage, and adjust the voltage to a voltage level that maintains the current at or below a predetermined threshold.

Another aspect of the present disclosure is to provide a dispensing device comprising a motor, a detector and a controller. The motor is configured to operate a material dispenser. The power supply is configured to provide a voltage to the motor to operate the material dispenser. The controller is programmed to monitor at least one of a current provided to the motor and the speed of the material dispenser, and increase at least one of the current from an initial current to a target current and an initial speed to a target speed over a predetermined time interval.

Such embodiments enable continuous and consistent dispensing of a dispensing material. Moreover, the embodiments described herein improved dispensing by reducing the likelihood of an automatic shutdown when the material to be dispensed becomes viscous by monitoring the speed of the material dispenser and the current supplied to the motor. These and other advantages will be apparent to those skilled in the art from the following detailed description, in conjunction with the annexed drawings.

Further, as will be apparent, the embodiments herein include the same technical features and solve the same technical problems.

BRIEF DESCRIPTION OF THE DRAWINGS

Referring now to the attached drawings which form a part of this original disclosure.

DETAILED DESCRIPTION OF EMBODIMENTS

Figure 1:
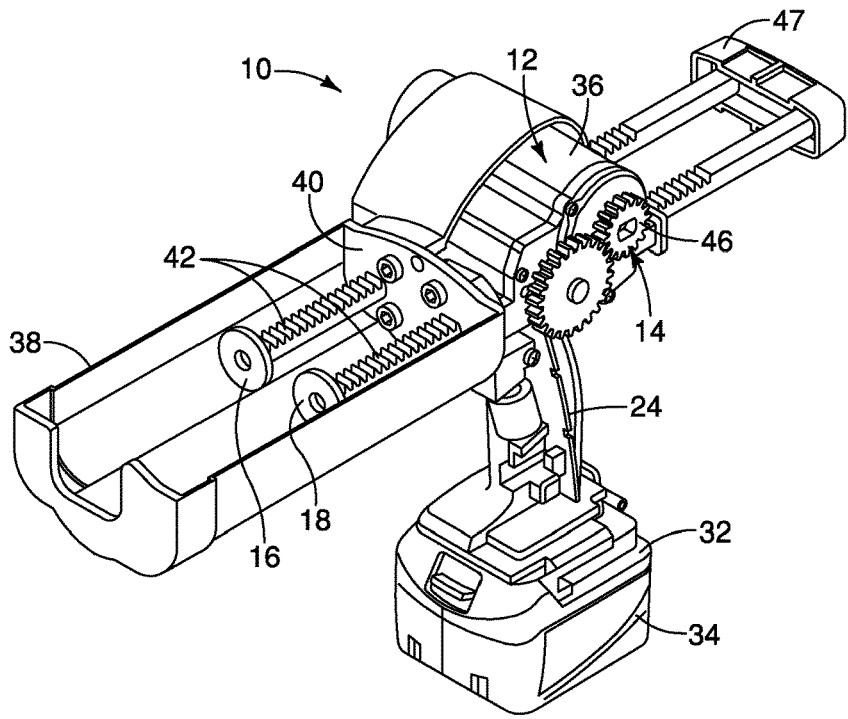
FIG. 1 is a top, front perspective view of an embodiment of a dispensing device.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a dispensing device 10 is illustrated in accordance with an embodiment. In this embodiment, the dispensing device 10 includes a housing 12, a drive unit 14, a material dispenser 16, a detector 20 and a controller 22.

The housing 12 includes a handle 24 for gripping by an operator for operating the dispensing device 10 to dispense material. The handle 24 includes a trigger switch or trigger 26, a speed control dial (SCD) 28 and an operation mode selection switch in the form of an on/off mode switch 30. The housing 12 accommodates the drive unit 14 and the controller 22. At the bottom 32 of the housing 12, a rechargeable battery pack or power supply 34 is attached in a manner normal for portable electric tools. Alternatively, the dispensing device 10 may include a cord for connection with a power supply such as a power outlet. As is understood, the power supply 34 (e.g., the battery) supplies a voltage to the drive unit 14 (e.g., a motor 36) to operate the material dispenser 16.

An LED indicator 68 can be disposed on the handle 24 for indicating specific conditions. In other words, the LED indicator 68 may indicate one or more of a number of specific conditions such as, first dispensing mode activated, second dispensing mode activated, low or full battery charge, overload (torque), high temperature, end-stop switch activated, etc.

A holder 38 is disposed at a front end 40 of the housing 12 to receive a receptacle for material to be dispensed. Thus, the holder 38 defines the front end of the dispensing device 10. The receptacle for material can be of any kind, e.g. cartridge type or of sausage type, which are types well known in the art, or any other suitable type of receptacle. The material can be any type of sealant or adhesive. For example, the sealant can be any ordinary one-component silicone. The curing of the silicone starts with the normal moisture that is present in the surrounding atmosphere. Alternatively, the material can be a two-component materials, such as polyesters, polyurethanes, epoxy or epoxy acrylate. These materials can be used as adhesives, putties or also as sealants.

The dispensing device 10 further comprises a rack 42. At the front end 43 of the rack 42 is at least one material dispenser 16. In one embodiment, the material dispenser 16 is a first material dispenser of a first material dispenser and a second material dispenser 18, with each of the material dispensers 16 and 18 being a plunger configured to be inserted into a respective receptacle. The material dispensers 16 and 18 are configured to drive and dispense the material. Although the material dispensers 16 and 18 are illustrated as plungers, the material dispensers 16 and 18 can be any suitable devices. The rack 42 extends through the drive unit 14, and at a rear end 45 opposite the front end 43 the rack 42, a second handle 47 is attached.

Since the first and second material dispensers 16 and 18 are connected through the second handle the rack 42, the first and second material dispensers 16 and 18 move in unison. The dispensing device 10 of the embodiment shown is generally used with a side-by-side cartridge. That is, the cartridge contains two cartridges adjacent each other such that the first and second material dispensers 16 and 18 can be disposed within adjacent cartridges and dispense separate materials simultaneously. Such a system enables materials to thoroughly mix and form an adhesive or mixed material right before or as they are being applied to a surface or area. However, it is noted that the dispensing device can be used with a container containing a co-axial container of viscous material. That is, a container containing two components of viscous material arranged coaxially in the container and separated by an annular partition inside the container. In the coaxial container, the two separate materials are dispensed from their respective containers into a mixer prior to being applied to the specific surface or area. Moreover, is desired, the dispensing device can be used with a container containing having only one component (of viscous material or any other suitable container.

Figure 2:
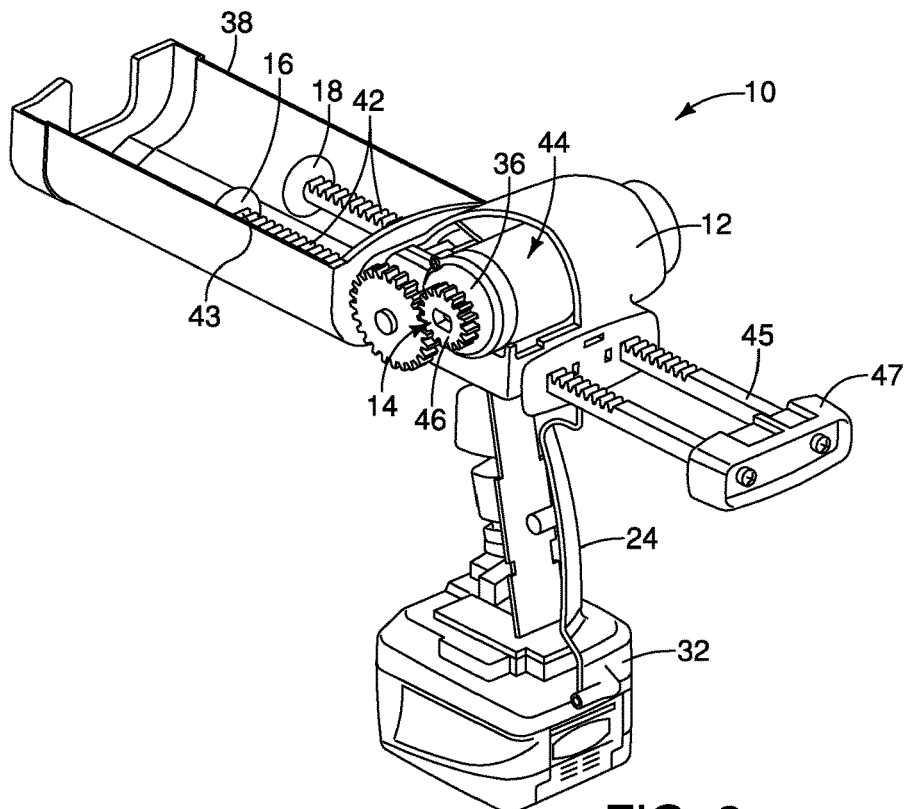
FIG. 2 is top, rear perspective view of the dispensing device of FIG. 1.
Figure 3:
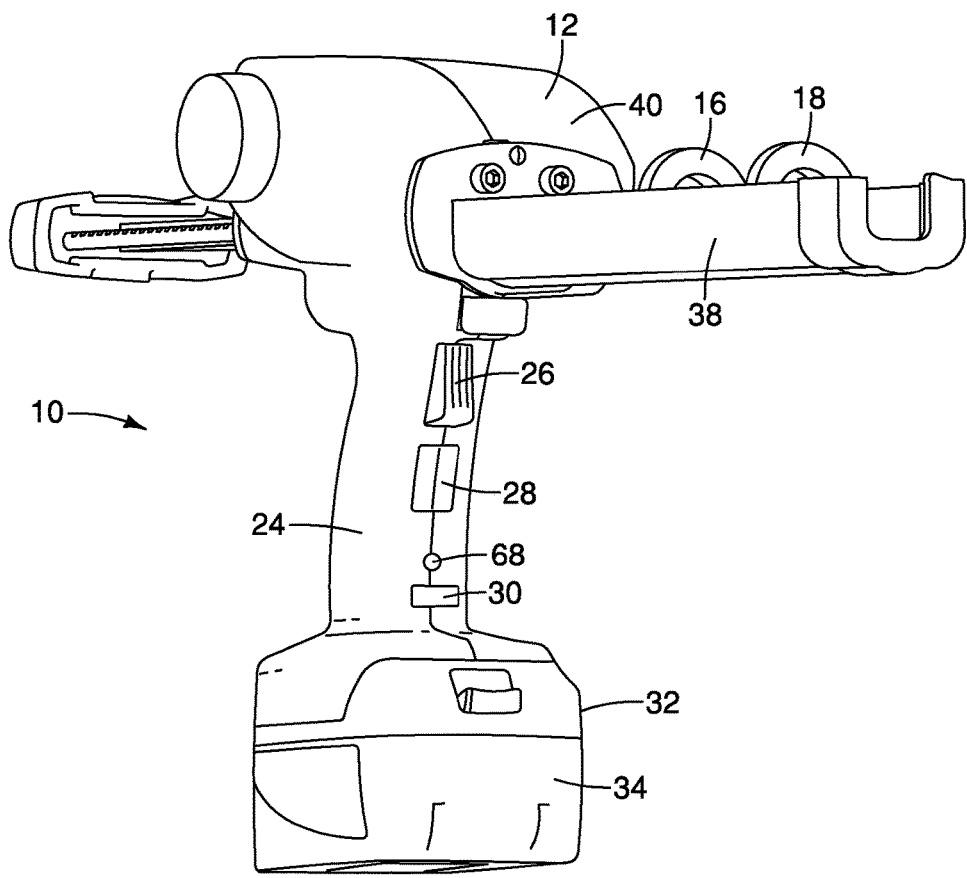
FIG. 3 is a front perspective view of the dispensing device of FIG. 1.

As shown in FIGS. 1-3, the drive unit 14 comprises a drive unit housing 44 accommodating the motor 36 driving through a gear train 46 with a cylindrical pinion gear meshing inside the drive unit 14 with the rack 42 to drive the latter.

Figure 4:
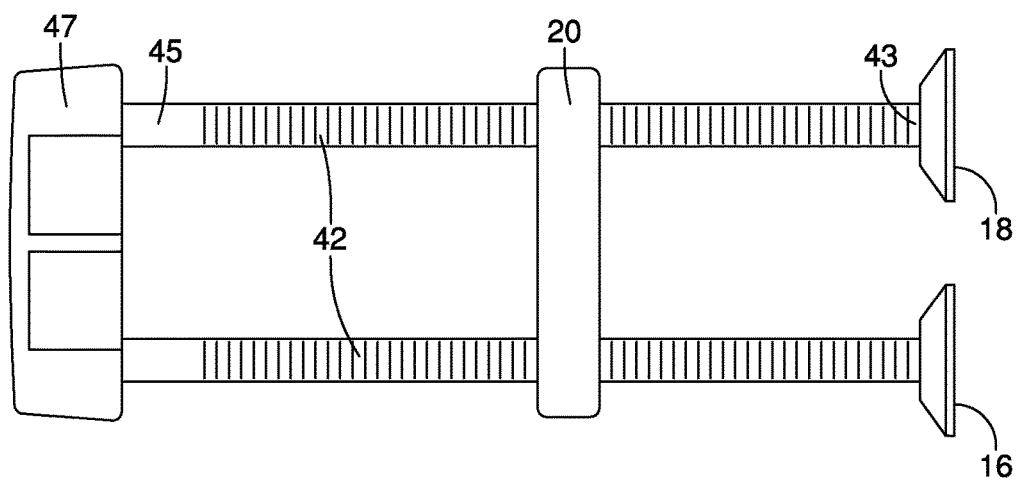
FIG. 4 is a partial schematic view of a sensor adjacent the material dispensers of the dispensing device of FIG. 1.
Figure 5:
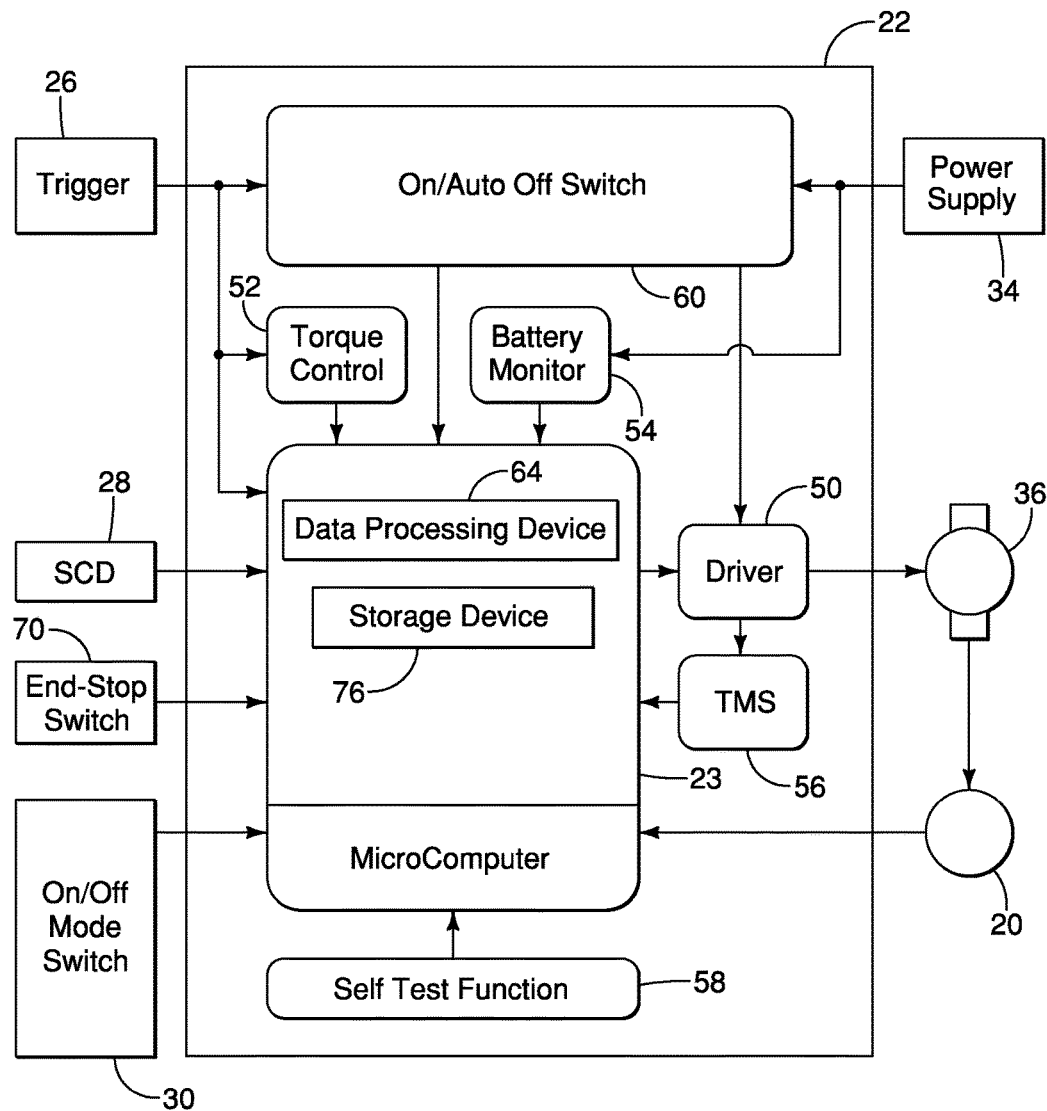
FIG. 5 is a schematic diagram of the dispensing device of FIG. 1 including a controller.

As shown in FIGS. 4 and 5, the detector 20 can be disposed adjacent the rack 42 of the first and second material dispensers 16 and 18. The detector 20 is preferably disposed within the housing 12 and is capable of detecting the movement of the material dispensers 16 and 18 and/or the rack 42; however, it is noted that the detector 20 can be disposed in any suitable position. The detector 20 can be an optical sensor, sliding calipers or any suitable sensor that can determine the distance and/or speed of the movement of the material dispensers.

The detector 20 can also be connected to the motor 36 and the controller 22, as illustrated in FIG. 5. Thus, the sensor is capable of determining the speed of the material dispensers 16 and 18 based on the speed of the motor. The data from the detector 20 is communicated to the controller for purposes of controlling the speed and or distance of travel of the material dispensers 16 and 18, as described herein.

In one embodiment, the detector 20 can include a revolution counter (e.g., a pulse generator) in communication with motor 36 and the controller for counting the pulses provided by the revolution counter. In this embodiment, the controller is capable of determining the speed and distance at which the material dispensers 16 and 18 have travelled based on the pulse generator. However, it is noted that the detector 20 can be any suitable detector and not limited to the description provided herein.

Turning to FIG. 5, the dispensing device 10 comprises a controller 22 with a microcontroller 23, a data processing device 64, a bi-directional DC motor driver 50, a torque control 52 for avoiding excess torque that could result in a mechanical breakdown, a battery monitor 54, a temperature monitoring system (TMS) 56 for avoiding excess temperature e.g. in the motor 36, a self-test function 58, and an on/auto off switch 60.

The controller 22 can also include other conventional components such as a storage device 76, (e.g. a ROM (Read Only Memory) device and a RAM (Random Access Memory) device). The microcomputer 23 of the controller 22 is programmed to (or configured to) control one or more of the drive unit 14, the trigger 26, the on/off mode switch 30, the speed control dial 28, the material dispenser 16, detector 20, and any other element, to make determinations or decisions, as discussed herein. The memory circuit stores processing results and control programs, such as ones for the drive unit 14, the trigger 26, the on/off mode switch 30, the speed control dial 28, the material dispenser 16, and detector 20 operation that are run by the processor circuit. The controller 22 is operatively coupled to the drive unit 14, the trigger 26, the on/off mode switch 30, the speed control dial 28, the material dispenser 16, and the detector 20 in a conventional manner. Such a connection enables the controller 22 to monitor and control any of these systems or devices as desired. The internal RAM of the controller 22 stores statuses of operational flags and various control data. The internal ROM of the controller 22 stores the information for various operations. The controller 22 is capable of selectively controlling any of the components of the dispensing device 10 in accordance with the control program. It will be apparent to those skilled in the art from this disclosure that the precise structure and algorithms for the controller 22 can be any combination of hardware and software that will carry out the functions of the present invention.

For input to the controller 22, the dispensing device 10 comprises the trigger 26, the speed control dial 28 the on/off mode switch 30, and an end-stop switch 70 for indicating an end position of the rack 42. The trigger 26 and the speed control dial 28 are coupled to a first potentiometer 72 and a second potentiometer 74, respectively, to control the speed at which the motor 36 or the material dispenser 16 operates. That is, a target speed can derived from the input of the first and second potentiometers 72 and 74 (e.g., a speed control dial 28 and a trigger 26) and the corresponding effective voltage for that target speed is determined. This effective voltage is converted to a pulse length by using the nominal voltage and this signal is delivered to the motor 36.

The dispensing device 10 can be configured in any suitable manner for retraction of the rack 42 and material dispensers 16 and 18 for the exchange of the receptacle with the material to be dispensed as is known.

Under normal operation, the operator uses the on/off mode switch 30 to select a first dispensing mode (off) or a second dispensing mode (on). In the first dispensing mode, the operator pulls the trigger 26 to dispense material from the container. Pulling the trigger 26 activates the on/auto off switch 60 to turn the controller 22 on, and activates the control program to reset the storage device 76 and start driving the motor 36 through the motor driver 50. The motor 36 drives the rack 42 and the material dispenser 16 through the gear train 46 and the pinion gear (not shown) whereby material to be dispensed is expelled from the receptacle.

The detector 20 can provide a pulse per revolution of the motor 36 and while the motor 36 is running, the data processing device counts the pulses received from the revolution counter and up-dates the storage device 76, which thus stores the number of revolutions performed by the motor 36 since the trigger 26 was pulled, and when the operator releases the trigger 26 the control program registers the end of a dispensing event and the storage device 76 stores the number of revolutions performed by the motor 36 during the dispensing event.

The operator may pull the trigger 26 again in a second dispensing event and the above series of actions are performed once again including resetting the storage device 76, which thus at the end of the second dispensing event stores the number of revolutions performed by the motor 36 during the second dispensing event.

When the operator has performed a dispensing event to his or her satisfaction and wishes to repeat the dispensing event e.g. to fill a hole with the same amount of material as during the latest dispending event, the operator switches the on/off mode switch 30 to select the second dispensing mode.

Additionally, as can be understood, upon depression of the trigger 26, the controller 22 detects the degree to which the trigger 26 is depressed from the corresponding setting of the first potentiometer 72 and the setting of the speed control dial 28. Based on this, the controller 22 determines a desired motor speed. The greater the degree to which the trigger 26 is depressed, the higher the desired speed of the motor 36. The controller 22 then directs the motor 36 to run, according to the desired motor speed.

When activated, rotation of the motor 36 is converted to rotation of the pinion gear via the gearing train 46. By engagement of the teeth of the pinion gear with the teeth of the rack 42, rotation of the pinion gear causes linear motion of the rack 42. Accordingly, activation of the motor 36 results in linear motion of the rack 42, which causes the material dispenser 16 to be advanced and retracted, depending on the direction of rotation of the motor 36.

When the material dispenser 16 is advanced, the material dispenser 16 applies a force to one end of the cartridge, causing material to be forced from the cartridge.

As the material dispenser 16 advances, the distance traveled by the material dispenser 16 can be monitored by the detector 20 or in any manner discussed herein. The monitored distance traveled by the material dispenser 16 can be compared against a dispensing distance. If the distance traveled by the material dispenser 16 has reached the dispensing distance, advance of the material dispenser 16 is halted. If the distance traveled by the material dispenser 16 has not yet reached the dispensing distance, the controller 22 continues to monitor the distance traveled by the material dispenser 16 until the desired distance is reached.

Once the distance traveled by the material dispenser 16 has reached the dispensing distance, corresponding to the desired amount of material to be dispensed, the controller 22 directs the motor 36 to stop.

Moreover, when the controller 22 (through e.g., the control program) registers the end of a dispensing event it can activate through the motor 36 to reverse a given number of revolutions to relieve a pressure in the container with the material to be dispensed in order to minimize the risk of material oozing from the dispensing device 10 and to facilitate retraction of the rack 42 and material dispenser 16 for exchange of the container with the material to be dispensed. That is, the material dispenser 16 slightly retracts to enter the anti-drip mode by the motor 36 operating in reverse to move the material dispenser 16 in a direction that is opposite to the dispensing direction to avoid or eliminate dripping at the end of the dispensing process.

Figure 6:
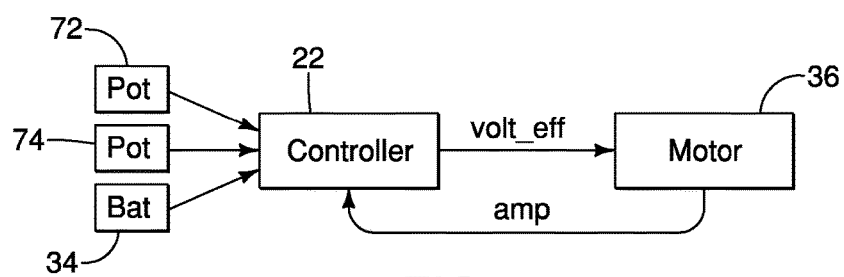
FIG. 6 is a schematic diagram of the controller and motor or FIG. 5.

As shown in FIG. 6, the first and second potentiometers 72 and 74 and the power supply 34 (e.g., the battery) can be connected the controller 22. The controller 22 is in turn connected to the motor 36. As described herein, the controller 22 determines the target speed from the first and second potentiometers 72 and 74 settings, and supplies the appropriate voltage to the motor 36. The controller 22 monitors the current (i.e., the amperage) of the motor 36. As is understood, the controller 22 can supply a specific voltage to the motor 36 by applying the voltage continuously or by switching a digital signal (pulse length) sufficiently fast on and off. For example, to establish a 3 volt signal, the controller 22 can switch between 5 volts and 0 volts, with the 5 volts being set 60% of the time and the 0 volts set 40% of the time. Moreover, in one embodiment, the controller 22 can adapt or modify the pulse length so that the effective voltage applied to the motor 36 is compensated for voltage changes of the battery. That is, the pulse length can be modified due to the charge status of the power supply 34 decreasing.

By monitoring the current in the motor 36, the controller 22 can also improve operation of the dispensing device 10. During some operations of the dispensing device 10, the force required to dispense the material may change. In some situations, the force may increase due to an increased viscosity of the material or other issue. In such a situation, the controller 22 can be programmed to monitor a current provided to the motor 36 (i.e., drive unit 14) based on the voltage, and adjust the voltage to a voltage level that maintains the current at or below a predetermined threshold. This will enable the dispensing device 10 to maintain operation, while reducing the current levels to at or below the critical threshold of the motor 36, avoiding damage to the motor 36 from excessive current levels.

In addition, the detector 20 can simultaneously detect the speed of the material dispensers 16 and 18 with the monitoring of the current to the motor 36. Thus, as the current and voltage to the motor 36 are adjusted, the speed of the material dispensers 16 and 18 may also be affected. Accordingly, the controller 22 can attempt to maintain the speed above a predetermined speed (e.g. 0.1 mm/sec). If the speed drops below this speed for a predetermined time, the controller can abort or stop of the dispensing.

Further, in one embodiment, as described above, the detector 20 detects the speed of the material dispensers 16 and 18 by directly detecting the speed of the racks 42 and/or by determining the speed through the speed of the motor 36 (e.g., based on the pulse generator). The controller 22 is programmed (through the control program) to maintain the speed of the motor 36 or the speed of the material dispenser 16 at a constant velocity or speed (e.g., target speed) based on the velocity detected by the detector 20. The target speed is preferably between about 0.5 mm/second and 5 mm/second; however, the target speed can be any suitable speed.

In addition, the controller 22 can monitor the current level to the motor 36 and maintain the speed of the motor 36 or the material dispenser 16 base on a constant amperage (e.g., target amperage). The target amperage is preferably between about 0.5 amps and 5 amps; however, the target amperage can be any suitable amperage.

Accordingly, the speed control dial 28 is used by the operator to set a maximum speed of the motor 36 and thus of the rack 42 and the material dispenser 16. The detector 20 is configured to detect the speed of the material dispenser 16 or the motor 36 and communicate this information to the controller 22. The controller 22 is programmed to maintain the material dispenser 16 at a constant velocity based on the velocity detected by the detector 20. The controller 22 is also programmed to terminate voltage supplied to the motor 36 (drive unit 14), when the detector 20 detects that the velocity or speed of the motor 36 or material dispenser 16 is less than a predetermined velocity.

To avoid overshooting the regulation window of the steady state normal mode, one embodiment includes a ramp up mode during the initial operation of the material dispenser 16. In this embodiment, first the material dispenser 16 is moved forward the same distance as it was moved in reverse after previous termination during the anti-drip mode. Second, the power supply 34 is configured to provide a voltage to the drive unit 14 to operate the material dispenser 16, and the controller 22 is programmed to monitor at least one of a current provided to the drive unit 14 (i.e., motor 36) and the speed of the material dispenser 16, and increase at least one of the current from an initial current to a target current and an initial speed to a target speed over a predetermined time interval.

In other words, during initial operation of the dispensing device 10, the controller 22 initially sets the amperage (i.e., current) level to 50% of the level for steady state operation (i.e., the target speed). The controller 22 then increases the current in steps (e.g., 1% over 5 seconds) until 100% of the current level is reached to maintain the target speed.

Alternatively, the controller 22 can set the speed of the motor 36 (or the material dispenser 16) to 50% of the target speed and increase the speed of the motor 36 (or the material dispenser 16) in steps (e.g., 1% over 3 seconds) until the target speed is reached. It is noted that the step increases set forth herein are merely exemplary and the step increases can be any suitable step increases.

Figure 7A:
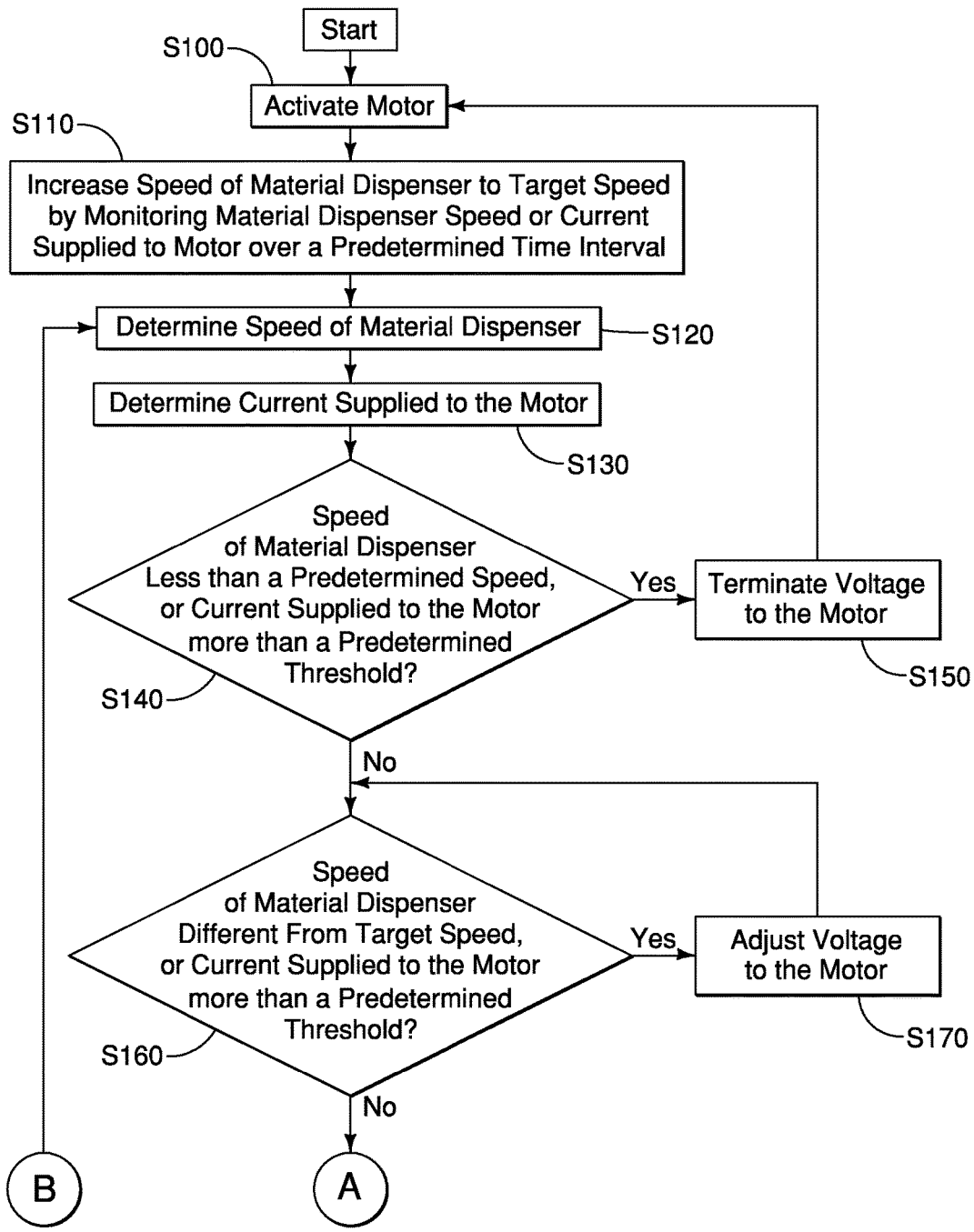
FIGS. 7A and 7B illustrate the controller procedure for controlling the dispensing device of FIG. 1.
Figure 7B:
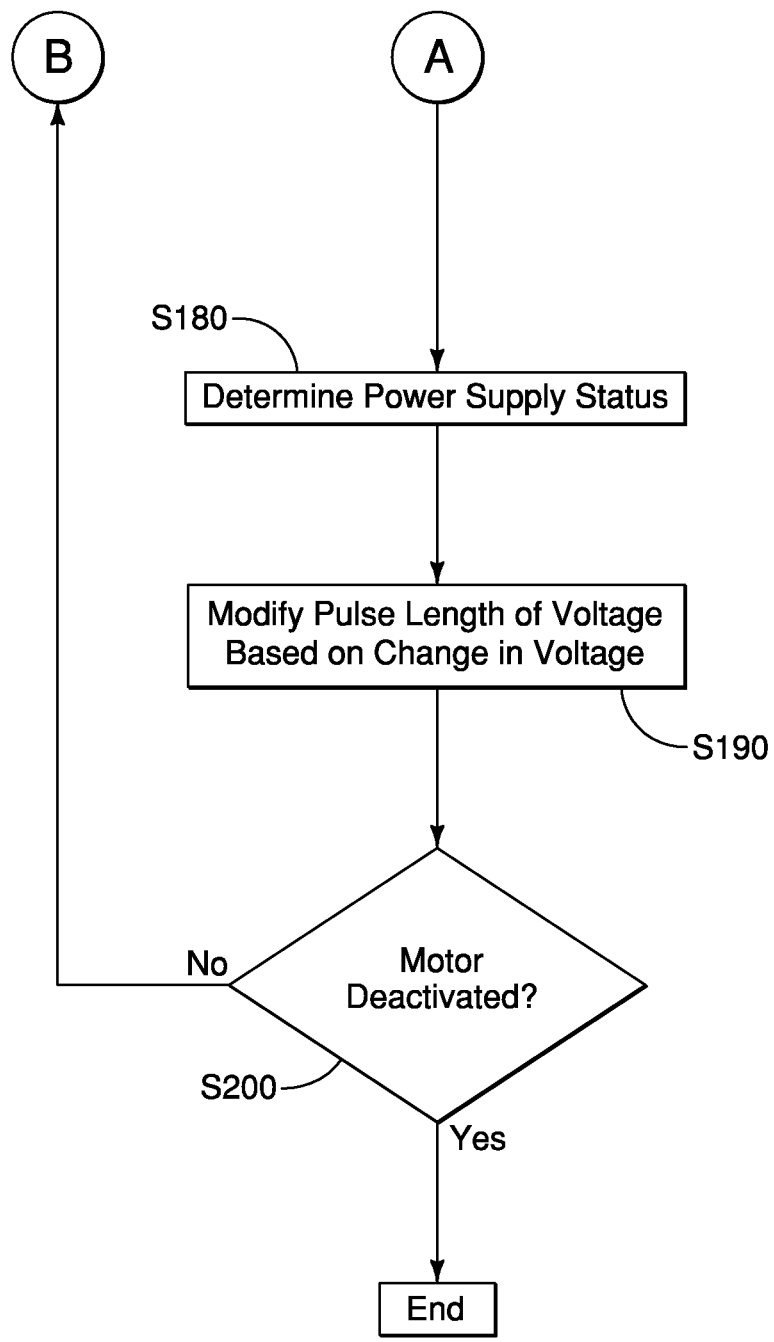

Turning to FIGS. 7A and 7B, the operation of an embodiment is discussed. As shown in step S100 in FIG. 7A, the motor 36 (i.e., drive unit 14) of the dispensing device 10 is activated. The target speed can be set using the trigger 26 and the speed control dial 28 as discussed herein. In step S110, the controller 22 increases the speed of the material dispenser 16 (or the motor 36) by monitoring the speed of the dispensing device 10 (or the motor 36) or by monitoring the current supplied to the motor 36 over a predetermined time interval. The target velocity is met and the dispensing device 10 enters into steady state operation.

In step S120, the detector 20 monitors the speed of the material dispenser 16 (or the motor 36) and communicates this speed to the controller 22. Additionally, in step S130, the current supplied to the motor is determined. In step S140, the controller 22 determines whether the speed of the material dispenser 16 (or the motor 36) is less than a predetermined speed. If the speed is less than a predetermined (or target) speed, the controller 22 terminates the voltage to the motor 36 in S150, stopping the dispensing device 10 and entering a shutdown mode. In the shutdown mode, the controller 22 can also reverse the motor 36 to enter an anti-drip mode. For example, the controller 22 may determine that the speed of the material dispenser 16 is zero or substantially zero, and has been zero or substantially zero for a predetermined amount of time. Alternatively, the controller 22 may determine that the speed of the material dispenser 16 is below a minimum threshold and enters shutdown mode. As such, the controller 22 can determine that the dispensing device 10 may be damaged from continued use and shut down.

If the controller 22 determines that the material dispenser 16 (or the motor 36) speed is not less than a predetermined, the controller 22 then determines whether the speed of the material dispenser 16 (or the motor 36) is different than the target speed or whether the current supplied to the motor is more than a predetermined threshold in step S160. That is, the controller 22 determines whether the speed of the material dispenser 16 (or the motor 36) is different than the steady state operation set by the trigger 26 and the speed control dial 28 and whether the current is greater than a threshold current. If the speed of the material dispenser 16 (or the motor 36) is different than the target speed and/or the current supplied to the motor is more than a predetermined threshold, in S170, the controller 22 adjusts or modifies the voltage to the motor 36 until the target speed and/or the threshold current is met. For example, if the controller 22 determines that the speed of the material dispenser 16 (or the motor 36) is less than the target speed, the voltage is increased. Moreover, if the controller 22 determines that the speed of the material dispenser 16 (or the motor 36) is greater than the target speed, the voltage is decreased. Similarly, if the controller 22 determines that the current is greater than a threshold current, the voltage is decreased. As described herein, the voltage can be adjusted in any manner desired (e.g., adjusting the pulse length).

If the speed of the material dispenser 16 (or the motor 36) is not different than the target speed and the current supplied to the motor is not more than the predetermined threshold, the controller 22 determines the power supply 34 status in step S180. In step 190, the controller 22 modifies the pulse length supplied to the motor 36 based on the change in voltage from the power supply 34. Thus, if the power supply 34 is decreasing in charge, the controller 22 modifies the pulse length to ensure optimal operation of the dispensing device 10.

In step S200, the dispensing device 10 determines whether the motor 36 has been deactivated. That is, dispensing device 10 determines whether the trigger 26 has been released. If the motor 36 has been deactivated, the dispensing device 10 operation is at an end. If the motor 36 has not been deactivated, the dispensing device 10 returns to step S130 and again determines the speed of the material dispenser 16 (or the motor 36). The procedure is repeated until the motor 36 is deactivated either manually (by releasing the trigger 26) or automatically due to determination by the controller 22 of the speed of the material dispenser 16 (or the motor 36) being less than the predetermined speed.

Relating to the embodiment described above is should be noted that whereas the detector 20 is attached to the motor 36 for counting the revolutions of the motor 36 it is also possible to attach the detector 20 to an element of the gear train 46 or the pinion gear driving the rack 42. However due to the gearing the motor 36 makes the most rotations in relation to the distance of the movement of the rack 42 for which reason attaching the detector 20 to the motor 36 provides the highest resolution of the measurement of the movement of the rack 42 and the material dispenser 16. It is also possible to attach a detector 20 to the rack 42 to read the movements thereof using a technique e.g. known from sliding calipers, as discussed herein.

One skilled in the art will understand that the combination of the subject matter of the various claims and embodiments of the invention is possible without limitation in the invention to the extent that such combinations are technically feasible. In this combination, the subject matter of any one claim may be combined with the subject matter of one or more of the other claims. In this combination of subject matter, the subject matter of any one process claim may be combined with the subject matter of one or more other process claims or the subject matter of one or more granulated expandable recycled plastic material, or extruded, formed and expanded plastic material, or molded expanded plastic article claims or the subject matter of a mixture of one or more process claims and material or article claims. By analogy, the subject matter of any one material claim or article may be combined with the subject matter of one or more other material or article claims or the subject matter of one or more process claims or the subject matter of a mixture of one or more material or article claims and process claims. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned process embodiments may be combined with the subject matter of one or more of the other above-mentioned material embodiments or vice versa without limitation so long as technically feasible.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "portion" when used in the singular can have the dual meaning of a single part or a plurality of parts. Also as used herein to describe the above embodiment(s), the following directional terms "front", "rear", "left", and "right" as well as any other similar directional terms refer to those directions the Dispensing Device. Accordingly, these terms, as utilized to describe the present invention should be interpreted relative to the Dispensing Device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

Using the dispensing device according to the present invention an operator is able in a convenient manner to improve dispensing a material. While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A dispensing device comprising:
a drive unit configured to operate a material dispenser;
a power supply configured to provide a voltage to the drive unit to operate the material dispenser; and
a controller configured to monitor at least one of a current provided to the drive unit and the speed of the material dispenser, and increase at least one of the current from an initial current to a target current and an initial speed to a target speed over a predetermined time interval.

2. The dispensing device of claim 1, wherein
the controller is configured to increase the speed of the material dispenser to the target speed by increasing the speed of the material dispenser at intervals of 0.1 seconds for 3 seconds.

3. The dispensing device of claim 1, wherein
the controller is configured to increase the current provided to the drive unit to the target speed by increasing the current of the material dispenser at intervals of 0.1 seconds for 5 seconds.

4. The dispensing device of claim 1, wherein
the target speed is between 0.5 and 5 mm/s.

5. The dispensing device of claim 1, wherein
the material dispenser is a plunger.

6. The dispensing device of claim 1, wherein
the material dispenser is a first material dispenser of a plurality of material dispensers, and the drive unit is configured to operate the plurality of material dispensers.

7. The dispensing device of claim 1, wherein
the dispensing device is configured to mix first and second materials.

8. The dispensing device of claim 1, wherein
the controller is configured to set at least one of the initial current and the initial speed.

* * * * *